Oct. 6, 1964

H. L. VAN HOENE 3,151,526

GEAR MOTOR

Filed Sept. 24, 1962

INVENTOR.
Harry L. Von Hoene,
BY
Wood, Herron & Evans.
ATTORNEYS.

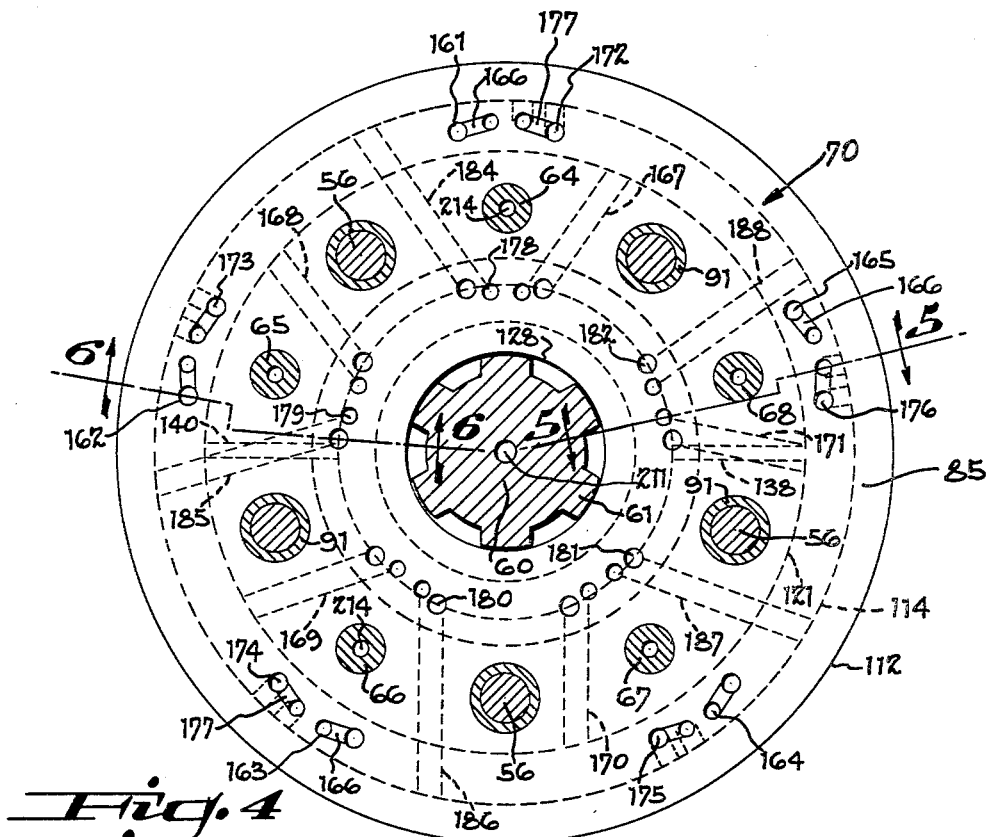
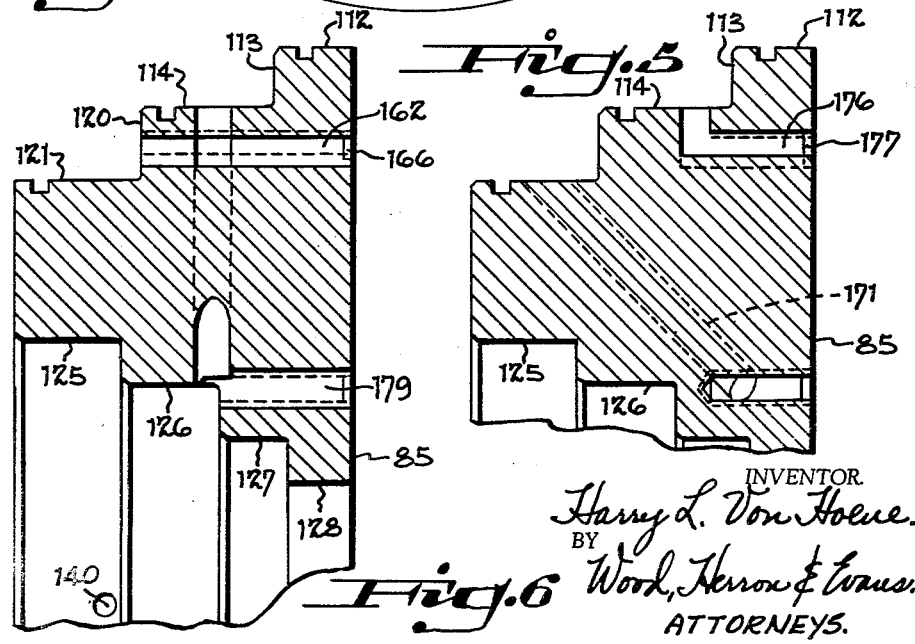

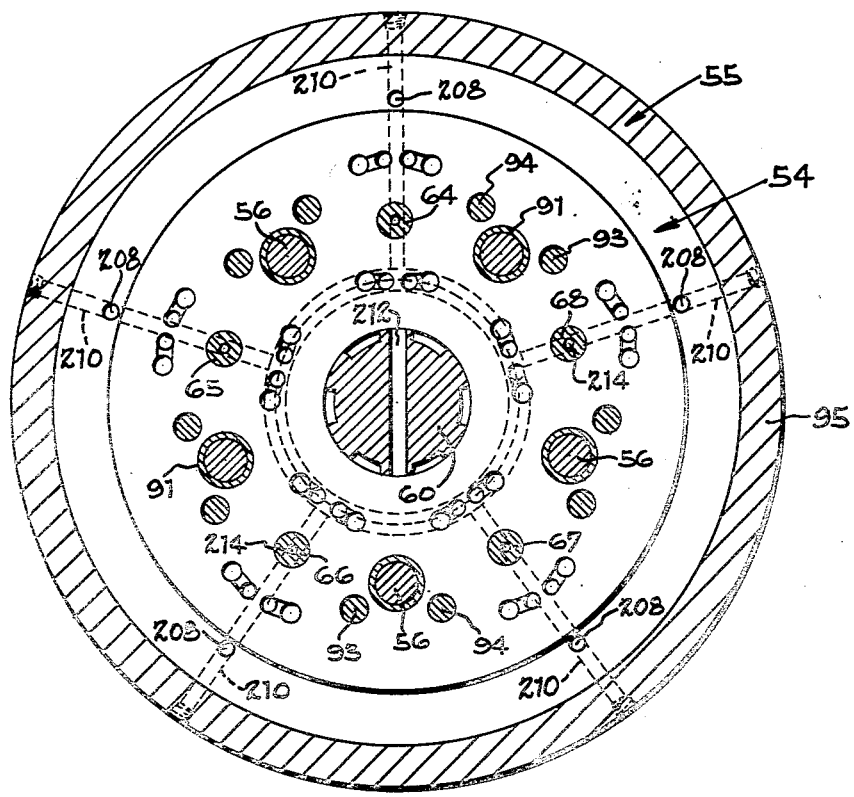

United States Patent Office 3,151,526
Patented Oct. 6, 1964

3,151,526
GEAR MOTOR
Harry L. Van Hoene, Columbus, Ohio, assignor to Denison Research Foundation, Powell, Ohio, a nonprofit corporation of Ohio
Filed Sept. 24, 1962, Ser. No. 225,548
8 Claims. (Cl. 91—68)

The present invention relates to hydraulic motors and is particularly directed to a high torque, low-speed gear motor.

At the present time, it is conventional to drive many loads, such as hoists and the like, which are shifted at slow speeds but require high torque, through the combination of a high-speed fluid motor and a gear reduction and transmission unit. Drives of this type have proven to be not completely satisfactory in several respects. In the first place, a high speed fluid motor has a relatively high inertia which makes it difficult to effect a quick stopping or reversal of the load. Moreover, the combined fluid motor gear and transmission unit are relatively bulky and inefficient with poor torque characteristics at slow speed and stall conditions.

The principal object of the present invention is to provide a slow speed, high torque motor in which a gear train somewhat analogous to a planetary train constitutes an integral part of the fluid motor. As a result, the output shaft of the motor unit is driven at a slow speed and has a high torque so that no auxiliary gear transmission unit is required.

A second important object of the present invention is to provide a gear motor which has a high mechanical efficiency and which exhibits a minimum amount of wear even after extended periods of use.

More particularly, a preferred form of gear motor embodying the principles of the present invention comprises a housing including a rotatable ring gear having internal teeth and a center or sun gear having external teeth. The sun gear is mounted concentric with the ring gear upon an output shaft of the motor unit. These gears are interconnected by a plurality of rotatable planetary gears, or pinions, mounted upon fixed shafts equi-spaced around the sun gear. These gears are mounted in a gear chamber together with a plurality of segment plates. Each of the segment plates is provided with a plurality of arcuate surfaces concentric with the adjacent gear teeth of the ring gear, sun gear and pinions.

Each planetary gear or pinion has two diametrically opposed pressure pockets associated therewith, one of the pockets being disposed intermediate the pinion and ring gear and the other pocket being disposed intermediate the pinion and sun gear. Similarly, each pinion has two diametrically opposed discharge spaces associated therewith, these spaces likewise being respectively disposed adjacent to the ring gear and sun gear. Suitable conduits are provided for introducing fluid under pressure to the pressure spaces and withdrawing fluid from the discharge spaces. As is explained in detail below the reaction forces of the pressure fluid cause the ring gear, pinions and sun gear to rotate to drive the output shaft.

One advantage of this construction is that the radial forces imposed upon the pinions, the ring gear and sun gear are counterbalanced. Consequently, the present motor can be operated effectively at very low speeds.

Another object of the present invention is to provide a gear motor in which the gears are maintained in close axial confinement with a small predetermined facial clearance, e.g. five ten thousandths of an inch, so that a minimum fluid leakage takes place over the gear faces. In the present motor, this is accomplished by making the segments slightly thicker than the gears. The segments abut one end wall of the gear chamber and a pressure plate constitutes the other wall. In accordance with the present invention, means are provided for subjecting the surface of the pressure plate remote from the gear chamber to the force of both the inlet fluid pressure and the discharge fluid pressure. Consequently, the pressure plate is maintained at all times in contact with the segments despite any elongation or deformation which may occur in the members, such as bolts holding the housing parts in assembled relationship. The pressure plate is thus effective to maintain the same small predetermined axial clearance for the gears.

Another object of the present invention is to provide means for axially centering the gears within the gear chamber so as to eliminate metal-to-metal contact. In accordance with the present invention, this is accomplished by relieving the faces of the gears so as to form a plurality of radially extending pads spaced from one another by depressed grooves or valleys. When the gears rotate within their narrow confined space, these pads ride up over the film of liquid to force the gears away from the adjacent metal surface and thereby center the gears axially within the gear chamber.

A still further object of the present invention is to provide a gear motor in which the segments can be accurately positioned relative to the gears so that fluid slippage is minimized and a maximum efficiency is obtained. In accordance with the present invention, each of the segments is mounted within the housing by means of a tubular dowel which is press fit into aligned openings in the segments and housing members. The housing members and segments are clamped together by means of elongated tension bolts which pass through the tubular dowel members. The dowels and bolts are preferably located at the center of moments of the forces acting upon the segments so that despite the high pressures involved the assembly does not twist or distort to alter the clearance between the gears and segments.

These and oher objects and advantages of the present invention will be more readily apparent from a consideration of the following detailed description of the drawings illustrating a preferred embodiment of the invention.

In the drawings:

FIGURE 4 is a cross sectional view taken along line 4—4 of FIGURE 2.

FIGURE 5 is a cross sectional view taken along line 5—5 of FIGURE 4.

FIGURE 6 is a cross sectional view taken along line 6—6 of FIGURE 4.

FIGURE 7 is a cross sectional view taken along line 7—7 of FIGURE 2.

Figure 1:
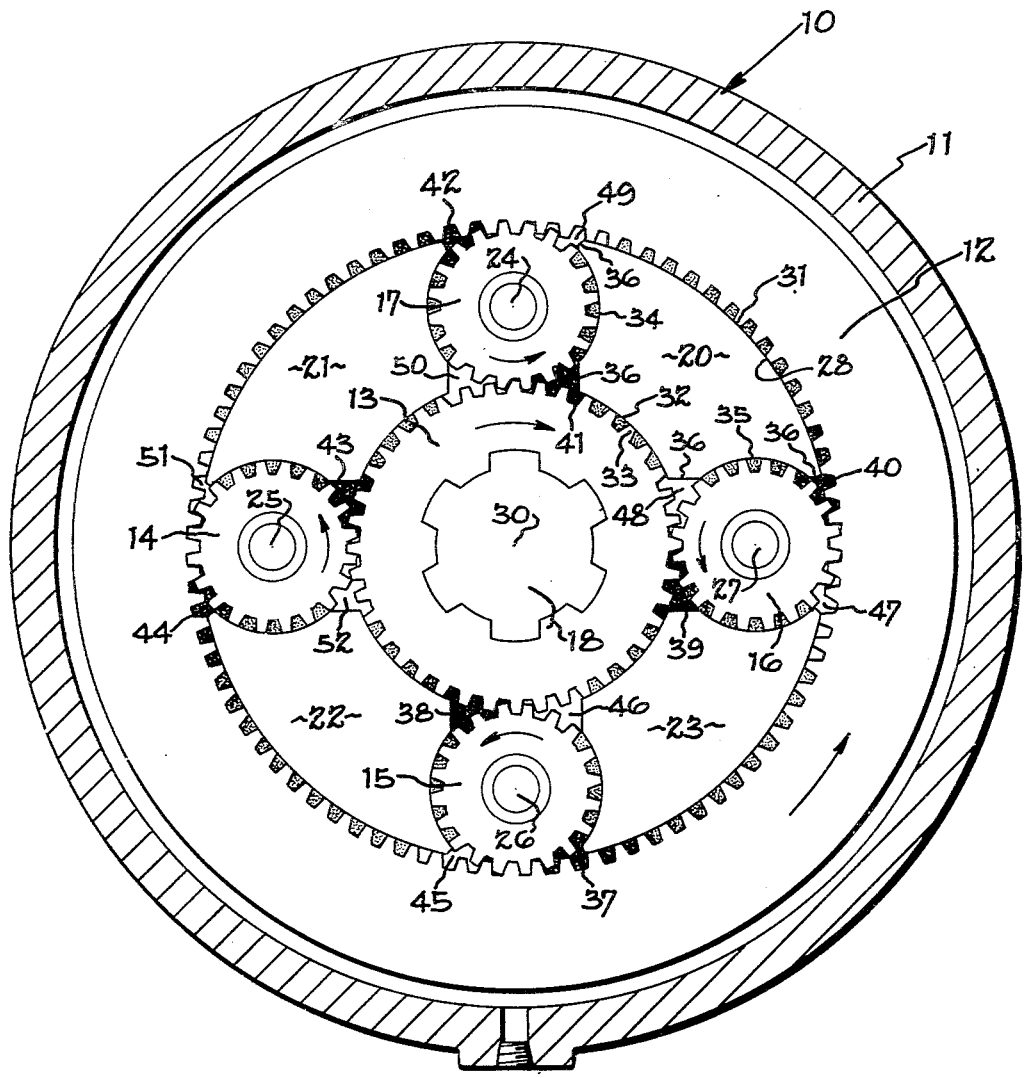
FIGURE 1 is a diagrammatic transverse sectional view of one form of gear motor of the present invention.

As is diagrammatically shown in FIGURE 1, a gear motor 10 of the present invention basically comprises a housing 11, a ring gear 12 rotatable within the housing, a rotatable sun gear 13 concentric with the ring gear and a plurality of rotatable planetary gears or pinions 14, 15, 16 and 17 circumferentially spaced about the sun gear and meshing with both the ring gear and sun gear. It is to be understood that while four pinions are shown in the diagrammatic view of FIGURE 1, and five pinions are shown in the preferred embodiment illustrated in FIGURES 2-6, a lesser or greater number of pinions can be provided if desired. In any case, however, the pinions are equispaced about the periphery of the sun gear so as to provide a radial counterbalance of forces.

In addition to the gears described above, the present motor includes a splined output shaft 18 which carries sun gear 13 and is rotatably journalled on a central bearing (not shown) carried by housing 11. A plurality of segment plates 20, 21, 22 and 23 are also provided for defining pressure pockets adjacent to the gears. Segment plates 20–23 are rigidly secured within housing 11 as are shafts 24, 25, 26 and 27 which rotatably support pinions 14–17.

Each of the segments 20, 21, 22 and 23 comprises a plurality of arcuate surfaces, each of which is concentric with the adjacent gear. Since each of the segments is identical, only segment 20 will be described in detail. Segment 20 comprises an outer cylindrical surface 28 which is concentric with the center 30 of shaft 18, gear 13 and housing 11. This surface 28, is closely spaced to the ends of teeth 31 of ring gear 12. Segment 20 further comprises an inner arcuate surface 32 which is concentric with the sun gear 13 and is closely spaced to the ends of teeth 33 of the sun gear. In a similar manner, segment 20 includes arcuate end surfaces 34 and 35 which are respectively concentric with planetary gears 17 and 16. The four arcuate surfaces meet at corners 36 of the segment which are disposed adjacent to the pressure pockets and outlet spaces of the motor.

More particularly, suitable conduits are provided in housing 11 for applying fluid under pressure from a suitable pump to eight pressure pockets 37–44. It is to be understood that in the diagrammatic view of FIGURE 1, the relative magnitude of fluid pressure present in the motor is indicated by the intensity of the shading in the interdental areas. As is shown in FIGURE 1, two pressure pockets are associated with each of the planetary gears or pinions 14–17. These pressure pockets are disposed along substantially diametral lines relative to each pinion. One pressure pocket, such as pressure pocket 37 associated with gear 15, is disposed adjacent the area where gear 15 meshes with ring gear 12, while the other pressure pocket 38 is disposed along the opposite side of gear 15 in the area where that gear meshes with sun gear 13.

Housing 11 also includes suitable conduits for providing fluid communication between eight outlet spaces 45–52 and a return line leading to a fluid sump. Specifically, each planetary gear 14–17 has two low pressure or discharge spaces associated with it. These low pressure areas are disposed upon the ends of substantially diametral lines in the same manner as the pressure pockets. Each discharge space is located on the opposite side of the meshing area of the pinion, ring gear and sun gear from the pressure pocket. Thus, for example, discharge space 45 associated with pinion 15 is located adjacent to the area in which pinion 15 meshes with ring gear 12 and is located on the opposite side of the meshing area of these two gears from pocket 37. In a similar manner, discharge space 46 is disposed adjacent to the area in which pinion 15 meshes with sun gear 13 and is located on the opposite side of the meshing area of these gears from pressure pocket 38.

In operation, fluid under high pressure, e.g. 2000 p.s.i., is introduced into the eight high pressure pockets 37–44. The reaction forces due to this pressure cause the gears to rotate in the direction shown, i.e. ring gear 12 rotates in a counterclockwise direction together with planetary gears 14–17, while sun gear 13 is driven in a clockwise direction. This sun gear in turn drives output shaft 18 in a clockwise direction. As ring gear 12 is rotated, a portion of the high pressure fluid is carried in the space between the teeth of ring gear 12 and the adjacent surface of segments 20–23. There is a slight fluid leakage between the teeth and segments as well as a slight leakage over the faces of the gears. Thus, the pressure of the fluid entrapped between each pair of teeth decreases as the teeth approach the next discharge space. When the teeth reach this space, fluid flows outwardly through suitable conduits to a sump from which it is recirculated by the pump to a high pressure space.

In a similar manner, fluid is carried under pressure from each of the high pressure pockets in the spaces between teeth of each of the pinions 14–17 and the adjacent curved sections of the segments 20–23. Again, due to a slight leakage, the pressure in each interdental space decreases as the space approaches the next discharge pocket. When the space reaches the discharge pocket, fluid flows outwardly through suitable conduits to the sump. Still additional portions of the high pressure fluid are carried in the interdental spaces of sun gear 13 in the areas between that sun gear and the adjacent surfaces of segments 20–23. The pressure of the liquid in each interdental space decreases due to the leakage explained above as the interdental space approaches the next discharge space. When each interdental space reaches the discharge pocket, the liquid entrapped in the interdental space is discharged from this space and is returned to the sump. By providing equispaced identical segments, the forces caused by the pressures in each interdental space are counterbalanced.

The details of construction of a preferred form of motor are shown in FIGURES 2–6. In general, this motor comprises a gear enclosing housing 53 including a head 54 and a cover member 55 secured together by a plurality of elongated bolts 56. The head supports a first roller bearing 57, while the cap supports a second roller bearing 58 which together rotatably journal output shaft 60. Shaft 60 includes a splined portion 61 upon which is mounted a center or sun gear 62.

A ring gear 63 is rotatably supported in concentric relationship with sun gear 62. A plurality of fixed longitudinal shafts 64, 65, 66, 67 and 68 are press fit in openings bored in head 54. The opposite ends of these shafts are supported in aligned openings machined in a pressure plate 70. These shafts carry suitable bearings, such as bearing 71 in FIGURE 2, which rotatably journal pinions 72, 73, 74, 75 and 76. These pinions which are equispaced about the periphery of sun gear 62, mesh with the sun gear and with the internal teeth on ring gear 63.

Figure 2:
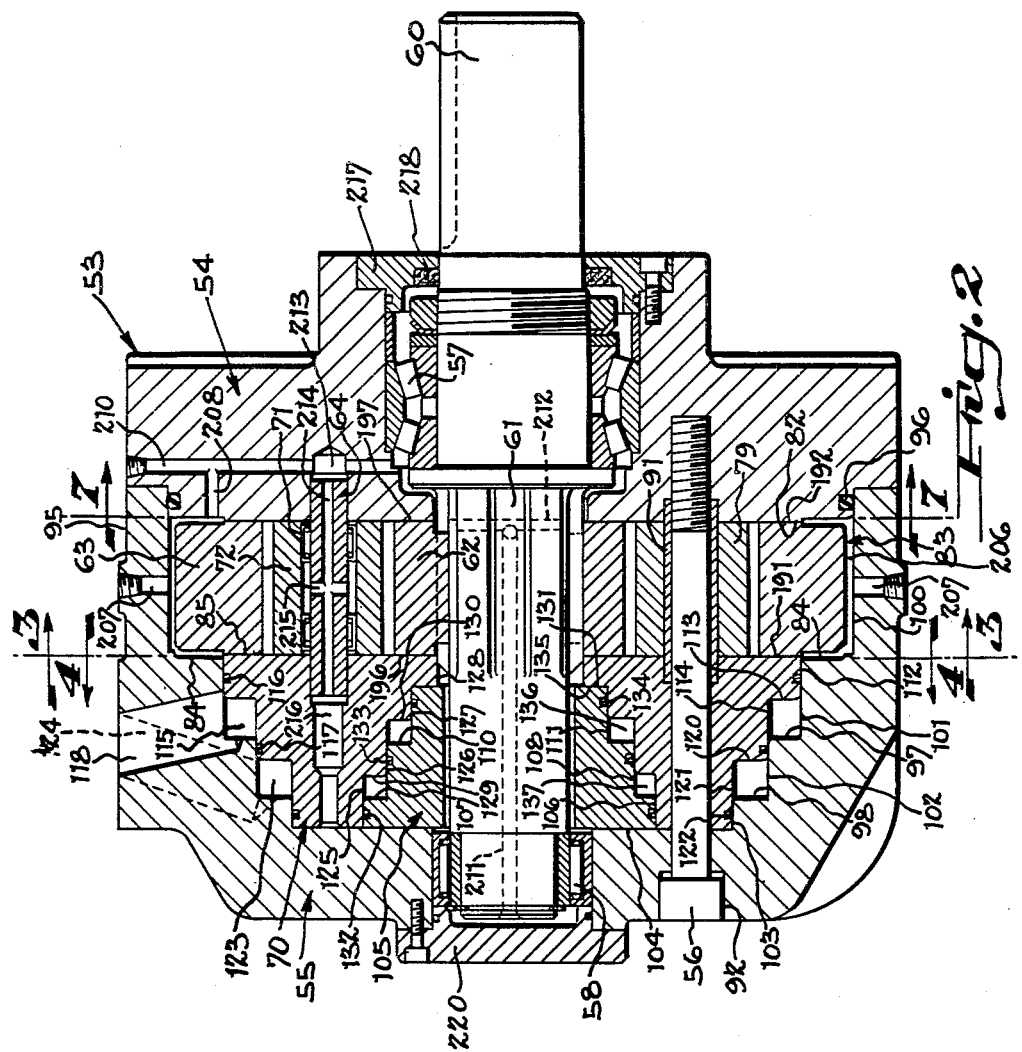
FIGURE 2 is a longitudinal cross sectional view of a preferred form of motor embodying the present invention.
Figure 3:
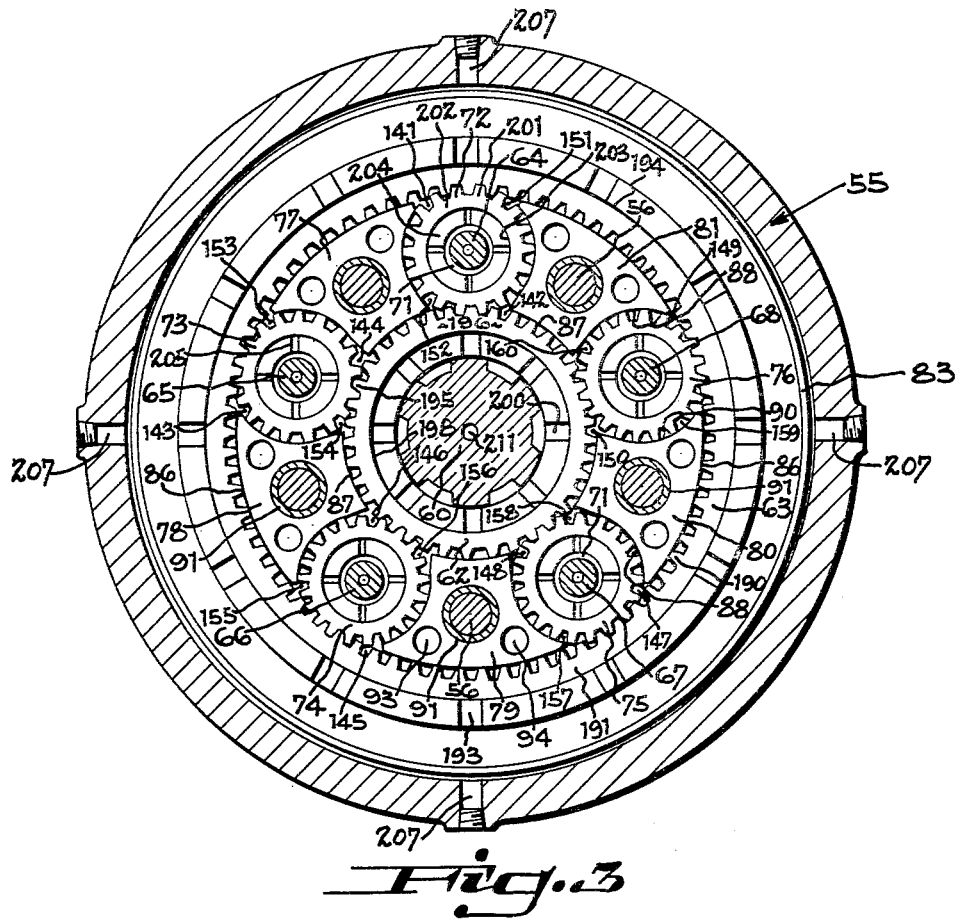
FIGURE 3 is a cross sectional view taken along line 3—3 of FIGURE 2.

As is best shown in FIGURES 2 and 3, the gear motor also comprises a plurality of segment plates 77–81. These segment plates include a plurality of arcuate surfaces which cooperate with the gears to provide a plurality of pressure pockets and discharge spaces.

More particularly, head 54 is of generally circular cross section and includes a circular, planar inner face 82 defining one end wall of a gear chamber 83. The opposite wall of the gear chamber is formed by an inwardly extending shoulder 84 formed on cover member 55 and an annular face 85 machined upon pressure plate 70. The annular face 85 of pressure plate 70 abuts one surface of segment plates 77–81. The opposite surface of these segment plates abuts face 82 of the head member 54. In accordance with the present invention, the thickness of these segment members is of the order of ten thousandths of an inch greater than the maximum thickness of the ring gear 63, sun gear 62 and pinions 72–76. Thus, when the pressure plate is held against the segments in the manner explained below, a positive axial clearance is provided in gear chamber 83 for each of the pinions, the sun gear and the ring gear, it being understood that all of these gears are preferably of the same thickness.

Pinions 72–76 are equispaced about the periphery of the sun gear 62 so that each of the segments between adjacent pinions is of the same size. Each of these segments includes an arcuate outer surface 86 which is concentric with the center of shaft 60, sun gear 62 and ring gear 63. This surface is disposed closely adjacent to the inwardly facing teeth of the ring gear. Each segment also includes an arcuate inner surface 87 also concentric with the center of shaft 60. This surface is disposed adjacent to the teeth of sun gear 62. Each of the segment plates also includes arcuate side surfaces 88 and 90 concentric with the center of the pinions disposed on either side of the segment. Surfaces 88 and 90 are closely spaced relative to the teeth of these adjacent pinions.

Each of the segment members is accurately located in position by means of a tubular dowel pin 91. Each of the dowel pins 91 is press fit into accurately aligned openings formed in head member 54, one of the segment members 77–81 and pressure plate member 70. The center of this tubular dowel pin is preferably located on the center of moments of the forces acting on the segment member. A bolt 56 passes through the center of each tubular dowel with the head of the bolt being disposed in a counter-bored opening 92 in the cover member and the inner end of the bolt threadably engaging a tapped opening provided in the head member. Rotation of the segment members is prevented by additional pins 93 and 94. Two of these pins pass through each segment and are press fit into aligned openings formed in the head member 54 and segment.

Cover member 55, which encloses the gears, segment plates and pressure plate, is a generally bell-shaped member having a skirt portion 95 which fits in an annular groove formed in the periphery of head member 54. A fluid-tight seal at the juncture of these members is provided by means of an O-ring 96. As was indicated above, cover member 55 is held in assembled relationship with head member 54 by means of elongated bolts 56. Elongation or stretching of these bolts would permit pressure plate 70 to be shifted away from head member 54 if the pressure plate and cover member were integral. This in turn would normally tend to alter the width of the gear chamber 83 and would increase the axial clearance of the gears so that an excessive fluid loss would occur over the face of the gears. In order to prevent any such movement of the pressure plate away from head 54, the cover member 55 and pressure plate 70 are constructed so that in effect the cover plate functions as a cylinder and the pressure plate functions as a piston upon which both the inlet and outlet pressures act. These fluid pressures are effective to force the pressure plate against the segments so as to maintain an absolutely uniform axial gear clearance under all pressure conditions despite any elongation of bolts 56.

More particularly, cover member 55 is provided with three annular steps or shoulders 84, 97, and 98. These shoulders separate four cylindrical inner wall portions of cover 55 of progressively decreasing diameter. These wall portions are indicated in FIGURE 2 by the numerals 100, 101, 102 and 103. The inner cavity of cover 55 also includes an annular rear wall 104. A multi-diameter plug member 105 abuts rear wall 104 of the cover. This plug member is provided with a central opening which surrounds shaft 60. Plug member 105 includes a cylindrical wall 106 of maximum diameter adjacent to wall 104 of the cover. Wall 106 is in turn joined to an annular shoulder 107 which extends inwardly to a cylindrical wall 108 of intermediate radius. An annular shoulder 110 extends inwardly from wall 108 to a wall 111 of a still smaller radius than wall 108.

Pressure plate 70 comprises three sections of circular cross section, each of the sections being of a progressively smaller diameter. The largest section of pressure plate 70 includes a cylindrical wall 112 adjacent to face 85 of the pressure plate. The diameter of this wall is substantially the same as that of wall 101 of cover member 55. However, the thickness of cylindrical portion 112 of the pressure plate is only a fraction, e.g., one-half of the length of wall 101. An annular shoulder 113 extends inwardly from the end of cylindrical wall 112 to an intermediate cylindrical wall 114. This cylindrical wall is of substantially the same diameter as wall 102 of the cover member. Thus, an annular fluid chamber 115 is formed between shoulder 113 and wall 114 of the pressure plate and shoulder 97 and wall 101 of the cover member. O-rings 116 and 117 are effective to prevent escape of fluid from this chamber between the engaging cylindrical walls, the pressure plate and cover.

Cover member 55 is provided with a connecting bore 118 which extends from the outer wall of the cover and communicates with annular fluid chamber 115. Pressure plate 70 further includes an annular shoulder 120 which extends inwardly from wall 114 to a third cylindrical wall 121 of the pressure plate. This cylindrical wall 121 of the pressure plate is of the same diameter as wall 103 of the cover member. An O-ring 122 is disposed between these walls to provide a fluid-tight seal. Wall 121 and shoulder 120 of the pressure plate and wall 102 and shoulder 98 of the cover form an annular fluid chamber 123.

This fluid chamber communicates with a bore 124 formed in cover member 55. It is to be understood that either bore 124 or bore 118 can be connected to a source of fluid pressure, while the other bore is connected to an exhaust line to sump. By reversing these connections, the direction of rotation of shaft 60 can be reversed. In order to simplify the description of the motor, it will be assumed that bore 124 is connected to a pressure source and hence constitutes the fluid inlet connection to the motor. In a similar manner, bore 118 is assumed to be connected to an exhaust line to sump.

The pressure plate 70 is also configurated to receive plug member 105. More particularly, the pressure plate is hollowed to form cylindrical walls 125, 126, 127, and 128 respectively joined by shoulders 129, 130 and 131. Wall 125 of the pressure plate is of substantially the same diameter as wall 106 of plug member 105. An O-ring 132 is disposed between these walls to provide a fluid-tight seal. Similarly, wall 126 of the plug surrounds wall 108 of the plug member, an O-ring 133 being compressed between these members. Wall 127 of the pressure plate surrounds wall 111 of the plug member, a fluid-tight joint between these membrs being provided by an O-ring 134. Shoulder 131 of the pressure plate abuts a shoulder 135 formed on the plug member. The perssure plate 70 and plug member thus form two annular chambers 136 and 137 respectively disposed concentric with and interiorly of chambers 115 and 123. Chamber 136 is connected to chamber 115 through radial bores 138, while chamber 137 is similarly connected to chamber 123 through radial bores 140 (FIGURE 4). This construction provides an even distribution of hold-down force to prevent base 85 of pressure plate 70 from deviating from a flat surface.

Pressure plate 70 is provided with a plurality of fluid bores communicating with annular fluid chambers 115 and 123. These bores are effective to conduct fluid from inlet or high pressure bore 124 to the high pressure pockets adjacent the gears and to conduct fluid from the discharge spaces adjacent the gears to discharge passageway 118. More particularly, as is best shown in FIGURE 3, the preferred embodiment of the motor includes ten pressure pockets 141–150.

Each pinion 72–76 has associated therewith two pressure pockets, the pressure pockets being disposed on diametrically opposite sides of the pinion so that a counter balance of radial forces across each pinion is obtained. For example, pinion 72 has associated therewith a pressure pocket 141 disposed adjacent to the area in which pinion 72 meshes with ring gear 63. Pinion 72 also has associated therewith a pressure pocket 142 disposed adjacent to the area of meshing of pinion 72 and sun gear 62. The pressure pockets associated with each of the remaining pinions are similarly disposed.

In addition to the pressure pockets, the preferred embodiment of the present motor includes ten outlet spaces or discharge spaces 151–160. Each of pinions 72–76 has two discharge spaces associated therewith, the discharge spaces also being disposed on diametral lines. For example, pinion 72 has one discharge space 151 associated therewith adjacent to the area in which pinion 72 meshes with ring gear 62. Discharge space 151 is located, however, on the opposite side of the meshing area of these two gears from pressure area 141. Pinion 72 has a second discharge space 152 associated therewith. This discharge space is disposed adjacent to the area of meshing of pinion 72 with sun gear 62. Again, however, discharge space 152 is disposed on the opposite side of the meshing area from the adjacent pressure area 142. The discharge spaces associated with the remainder of the pinions are similarly oriented relative to each other and to the pressure pockets. It is to be noted that the corners of the segments extend closely adjacent to the meshing areas of the pistons so that the pressure and discharge areas are of small cross sections relative to the size of the pinions.

Assuming that bore 124 is connected to a pressure source and hence functions as an inlet connection, a high pressure fluid flows from this bore into annular chamber 123 and through radial bores into annular chamber 137. Annular chamber 123 is interconnected to the outermost high pressure pockets 141, 143, 145, 147 and 149 by parallel pairs of bores 161, 162, 163 164 and 65 (FIGURE 4) respectively. These bores extend through face 85 of the pressure plate so as to communicate with the interdental spaces of the gears. The outlet openings of each pair of bores are joined by a milled, shallow groove, such as groove 166, associated with pair of bores 161. Annular pressure chamber 123 is also joined to the innermost set of pressure pockets 142, 144, 146, 148 and 150 by means of pairs of grooves 167, 168, 169, 170 and 171 respectively. These grooves also extend through face 85 of pressure plate 70 as is best shown in FIGURES 4 and 5.

In a similar manner, the outer discharge spaces 151, 153, 155, 157 and 159 are interconnected to annular chamber 115 through a plurality of pairs of bores 172, 173, 174, 175 and 176. These bores extend forwardly through face 85 of the pressure plate as is shown in FIGURES 4 and 5. The ends of the bores are interconnected by a thin, milled facial slot such as slot 177.

The inner discharge spaces 152, 154, 156, 158 and 160 are likewise connected to annular chambers 115 and 136 through pairs of axially extending bores 178, 179, 180, 181 and 182. These bores communicate directly with chamber 136 and with transverse bores 184, 185, 186, 187 and 188.

As was explained above, the pressure within annular chambers 136, 137, 115 and 123 forces pressure plate 70 inwardly and holds that pressure plate in firm contact with segments 77–81 despite any elongation in bolts 56. Since the thickness of the segments is a predetermined amount greater than the thickness of the gears, there is at all times a predetermined axial clearance of the gears. In accordance with the present invention, the gears are configured so as to automatically center themselves within this axial clearance.

More particularly, the surfaces of each of the gears are configured so as to provide raised pad areas which are small in relation to the total facial areas of the gears. Specifically, as is shown in FIGURES 2 and 3, ring gear 63 is an annular gear provided with inwardly facing gear teeth 190. The gear is provided with continuous annular shoulders 191 and 192 immediately surrounding the teeth area. These shoulders are the same thickness as the teeth and constitute the portion of greatest thickness of the ring gear. A plurality of radial pads 193 of the same thickness as shoulders 191 extend outwardly from the shoulders to approximately the mid point of the thickness of the ring gear annulus. The thickness of the ring gear intermediate the pads and radially outwardly beyond the pads is less than the thickness of the gear at the shoulder area or across the pads by a fraction of an inch, for example 1/16 of an inch. Each face of the gear also includes a circular groove 194 surrounding shoulders 191 and 192.

Center gear or sun gear 62 is an annular gear comprising peripheral teeth 195. Annular shoulders 196 and 197 are formed inwardly of teeth 195. These shoulders are the same thickness as the teeth and constitute the maximum thickness of the gear. A circular groove 198 surrounds each of the shoulders 196 and 197. A plurality of inwardly extending radial pads 200 are provided interiorly of groove 198. These pads extend inwardly to the splined center opening of the gear and are of the same thickness as the shoulders and gear teeth. The areas intermediate the pads are relieved to provide valleys between the pads.

Each of the pinions 72–76 is identical and includes peripheral teeth 201 and annular shoulders 202 disposed inwardly of the teeth. The shoulders and teeth are of the same thickness and constitute the areas of thickest portion of the gears. A groove 203 surrounds each of the shoulders 202 and separates the shoulders from a plurality of inwardly extending radial pads 204. These pads extend inwardly to the center opening of the pinions. The pads are separated by relieved or depressed areas 205.

The configuration of the ring gear, sun gear and pinions is such that the gears are automatically centered within the gear chamber. Specifically, as the gears rotate, the pads formed on each of the gears do not wipe the hydraulic fluid from the face 85 of the pressure plate and from the opposing face 82 of the head member. Rather, these pads ride up over a film of liquid and thus maintain a minute spacing between the gears and adjacent metal surface. This "riding over" action on each face of the gear automatically centers each gear and eliminates any metal-to-metal contact and excessive friction. At the same time, since the clearance space at the opposite side surfaces of the gear is limited by the spacing between the pressure plate and surface 85 of the head member to a very small amount, e.g. .0005″ excessive fluid leakage over the faces of the gear is minimized.

The small amount of leakage radially beyond the ring gear 62 flows into an annular space 206 surrounding the ring gear. Four radial ports 207 connect to this space. It is to be understood that in practice all but the uppermost of the ports is plugged. The uppermost port is connected to a return line to sump. The space 206 surrounding the ring gear also communicates with a plurality of longitudinal axial ports 208. These ports in turn communicate with five radial bores 210. The radial bores extend outwardly through head 54; however, all of these bores are plugged at their outer ends.

Radial bores 210 extend inwardly to main bearing 57 journalling shaft 60. The bearing is sealed by means of a conventional cap 217 and gasket 218. The main bearing journalling shaft 60 within the cover is in fluid communication with a longitudinal bore 211 in shaft 60. This bore opens into the space surrounding the bearing and also joins a transverse bore 212 which communicates with the space surrounding bearing 57. (This bearing is sealed by means of cap 220.)

Radial bores 210 also are joined to longitudinal openings 213. These openings are in registry with the ends of pinion shafts 64–68. Each of the pinion shafts 64 is provided with a longitudinal bore 214 and a transverse bore 215. Bores and passages 208, 210, 214, 215, 211 and 212 function primarily to carry oil that has leaked over the gear faces to chamber 206. The oil flows outwardly from this space through the uppermost discharge port 207. As a result, any undesirable pressure build-up due to leaking oil is prevented. As an incidental function, the various bearings are lubricated. The end of the pinion bearing mounted in pressure plate 70 communicates with a longitudinal bore 216 in the pressure plate. Thus, a fluid discharge conduit is provided for any fluid tending to accumulate between the pressure plate and cover member 55.

From the above description of the general principles of the present invention and the preceding description of a preferred embodiment, those skilled in the art will readily comprehend various modifications to which the invention is susceptible.

Among the specific modifications which are contemplated is the use of the present motor in a hydraulic system of the "metering out" type in which control is maintained over the flow of fluid in the discharge conduit. In such a system, the outlet pressure can be higher than, equal to or lower than the inlet pressure.

In another contemplated modification, the present motor can be modified for use with a stationary shaft; for example, if it is desired to provide a hydraulic wheel for a vehicle, or the like, a rim and a tire can be mounted upon head member 53. Shaft 60 is then held stationary and head 53 rotates about the shaft. In such a modification, ports 124 and 118 are replaced by two axial bores through the shaft 60. One of these bores is connected through proper transverse bores, grooves and packings through plug 105 to chambers 137 and 123. Similarly, the second axial bore through the shaft is connected through plug 105 to chambers 136 and 115. The casing drain oil is taken out through check valves to whichever bore is connected to a low pressure line.

In another contemplated modification, the motor can be applied to a drilling rig or similar device from which a bar, pipe, or the like, is fed axially at the same time it is rotated by the motor. In the present motor, this is accomplished by replacing output shaft 60 with the elongated bar, pipe, or the like, which extends completely through the motor. The drive for this bar is taken directly from center gear 62.

A still further modification of the motor is adapted for use where additional torque is required from a compact unit. In such a modification, power is taken from the ring gear. This gear provides twice the torque and half the speed as that provided in the specific embodiment shown. In such a unit, a tubular coupling is attached to ring gear 63. In this modification, the ports 124 and 118 are replaced in the manner explained above in connection with the stationary shaft embodiment.

In still another contemplated modification, means are provided for selectively taking power from the center gear and ring gear either alternately or simultaneously.

Accordingly, I desire to be limited only by the scope of the following claims.

Having described my invention, I claim:

1. A hydraulic motor comprising a housing including a head member and a cover member, a pressure plate disposed within said housing, said pressure plate and said head member having two opposed walls defining a gear chamber within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber intermediate said pinions, each of said segment plates having arcuate surfaces respectively adjacent to and in substantial sealing relation with the teeth of said ring gear, said sun gear and adjacent pinions, the thickness of said segment plates being slightly greater than the thickness of said ring gear, sun gear and pinions, said segment plates abutting the said wall of the head and the pressure plate whereby said segment plates determine the axial dimension of said gear chamber so that said gears have a predetermined axial clearance, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge space to an outlet line, and means applying fluid pressure against said pressure plate to maintain said pressure plate in contact with said segment plates.

2. A hydraulic motor comprising a housing including a head member and a cover member, a pressure plate disposed within said housing, said pressure plate and said head member having two opposed walls defining a gear chamber within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber intermediate said pinions, each of said segment plates having arcuate surfaces respectively adjacent to and in substantial sealing relation with the teeth of said ring gear, said sun gear and adjacent pinions, the thickness of said segment plates being slightly greater than the thickness of said ring gear, sun gear and pinions, said segment plates abutting the said wall of the head and the pressure plate whereby said segment plates determine the axial dimension of said gear chamber so that said gears have a predetermined axial clearance, and means for centering said ring and sun gear and pinions within said axial clearance, said means comprising a plurality of radial pads formed on opposite sides of said gears and pinions, said pads being separated by depressed areas, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge spaces to an outlet line.

3. A hydraulic motor comprising a housing including a head member and a cover member, a pressure plate disposed within said housing, said pressure plate and said head member having two opposed walls defining a gear chamber within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear, a plurality of stationary segment plates disposed within said gear chamber intermediate said pinions, each of said segment plates having arcuate surfaces respectively adjacent to and in substantial sealing relation with the teeth of said ring gear, said sun gear and adjacent pinions, the thickness of said segment plates being slightly greater than the thickness of said ring gear, sun gear and pinions, said segment plates abutting the said wall of the head and the pressure plate whereby said segment plates determine the axial dimension of said gear chamber so that said gears have a predetermined axial clearance, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith, a pressure chamber formed between said pressure plate and said cover member, first conduit means for connecting said chamber to a source of fluid pressure, and conduit means within said pressure plate for connecting said pressure chamber to said pressure pockets, the pressure in said pressure chamber being effective to maintain said pressure plate in engagement with said segment plates, and second conduit means for connecting said discharge spaces to an outlet line.

4. A hydraulic motor comprising a housing including a head member and a cover member, a pressure plate disposed within said housing, said pressure plate and said head member having two opposed walls defining a gear chamber within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber intermediate said pinions, each of said segment plates having arcuate surfaces respectively adjacent to and in substantial sealing relation with the teeth of said ring gear, said sun gear and adjacent pinions, the thickness of said segment plates being slightly greater than the thickness of said ring gear, sun gear and pinions, said segment plates abutting the said wall of the head and the pressure plate whereby said segment plates determine the axial dimension of said gear chamber so that said gears have a predetermined axial clearance, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith, a pressure chamber formed between said pressure plate and said cover member, first conduit means for connecting said chamber to a source of fluid pressure, and conduit means within said pressure plate for connecting said pressure chamber to said pressure pockets, the pressure in said pressure chamber being effective to maintain said pressure plate in engagement with said segment plates, and a second chamber intermediate said cover member and said pressure plate, said second chamber being connected to an outlet line, and conduit means formed in said pressure plate interconnecting said second chamber and said discharge spaces, the fluid pressure within said second chamber also being effective to urge said pressure plate into engagement with said segment plates.

5. A hydraulic motor comprising a housing, a gear chamber formed within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber, said gear chamber including two opposite wall members in abutment with said segment plates, each of said segment plates having arcuate surfaces respectively adjacent to and in substantial sealing relationship with the teeth of said ring gear, said sun gear and adjacent pinions, the ring gear, sun gear and pinions being of the same maximum thickness less than the thickness of said segment plates and having a small axial clearance within said gear chamber, said ring gear, sun gear and pinions each having a plurality of radial pads formed on the sides thereof, said pads being separated by depressed areas, said sun gear, ring gear andpinions further having a continuous annular shoulder of the same thickness as said pads formed on each side thereof, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge spaces to an outlet line, said pads being effective to center said ring gear, sun gear and pinions axially within said gear chamber.

6. A hydraulic motor comprising a housing, a gear chamber formed within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber, said gear chamber including two opposite wall members in abutment with said segment plates, each of said segment plates having arcuate surfaces respectively adjacent to and in substantially sealing relationship with the teeth of said ring gear, said sun gear and adjacent pinions, the ring gear, sun gear and pinions being of the same maximum thickness less than the thickness of said segment plates and having a small axial clearance within said gear chamber, said ring gear, sun gear and pinions each having a plurality of radial pads formed on the sides thereof, said pads being separated by depressed areas, said sun gear, ring gear and pinions further having a continuous annular shoulder of the same thickness as said pads formed on each side thereof intermediate the gear teeth and pads, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge spaces to an outlet line, said pads being effective to center said ring gear, sun gear and pinions axially within said gear chamber.

7. A hydraulic motor comprising a housing, a gear chamber formed within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and sai dring gear and being equispaced about the periphery of said sun gear, a plurality of stationary segment plates disposed within said gear chamber intermediate said pinions, a plurality of dowel pins for mounting said segment plates within said housing, said dowel pins being press fit in aligned openings in said housing and and each of said segment plates, the dowel pins being located at substantially the center of the moments of the forces acting upon said segment plates, each of said segment plates having arcuate surfaces respectively adjacent to and in sealing relation with the teeth of said ring gear, said sun gear and adjacent pinions, each of said pinions having two substantially diametrically opopsed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge spaces to an outlet line.

8. A hydraulic motor comprising a housing, a gear chamber formed within said housing, a ring gear rotatably mounted within said gear chamber, a sun gear disposed within said gear chamber concentric with said ring gear, an output shaft, said sun gear being fixedly mounted upon said output shaft, a plurality of pinions, shaft means carried by said housing and rotatably supporting said pinions, said pinions intermeshing with said sun gear and said ring gear and being equispaced about the periphery of said sun gear, a plurality of stationary segment plates disposed within said gear chamber intermediate said pinions, a plurality of tubular dowel pins for mounting said segment plates within said housing, said dowel pins being press fit in aligned openings in said housing and each of said segment plates, and a plurality of bolts for holding said casing in assembled relationship, said bolts passing through said dowel pins, said dowel pins and bolts being located at substantially the center of the moments of the forces acting upon said segment plates, each of said segment plates having arcuate surfaces respectively adjacent to and in sealing relationship with the teeth of said ring gear, said sun gear and adjacent pinions, each of said pinions having two substantially diametrically opposed pressure pockets associated therewith within said gear chamber, one of said pockets being disposed adjacent to the intermeshing portion of the pinion and sun gear, the other of said pockets being disposed adjacent to the intermeshing area of said pinion and said ring gear, and each of said pinions also having two substantially diametrically opposed discharge spaces associated therewith within said gear chamber, conduit means formed within said housing for connecting said pressure pockets to a source of fluid pressure and connecting said discharge spaces to a low pressure outlet line.

References Cited in the file of this patent
UNITED STATES PATENTS

| | | |
|---|---|---|
| 1,287,118 | Shore | Dec. 10, 1918 |
| 1,344,331 | Carrey | June 22, 1920 |
| 1,620,261 | Kennedy | Mar. 8, 1927 |
| 2,147,928 | Seagren | Feb. 21, 1939 |
| 2,311,237 | Loveday | Feb. 16, 1943 |
| 2,333,885 | Poulter | Nov. 9, 1943 |
| 2,371,227 | Dodge | Mar. 13, 1945 |
| 2,371,228 | Dodge | Mar. 13, 1945 |
| 2,399,008 | Doran | Apr. 23, 1946 |
| 2,655,108 | Osborne | Oct. 13, 1953 |
| 2,789,512 | Kremser | Apr. 23, 1957 |
| 2,986,097 | Chrzanowski et al. | May 30, 1961 |
| 3,076,413 | Hoffer | Feb. 5, 1963 |

FOREIGN PATENTS

| | | |
|---|---|---|
| 860,357 | France | Sept. 24, 1940 |
| 319,596 | Germany | Mar. 12, 1920 |

UNITED STATES PATENT OFFICE
CERTIFICATE OF CORRECTION

Patent No. 3,151,526                                                      October 6, 1964

Harry L. Von Hoene

It is hereby certified that error appears in the above numbered patent requiring correction and that the said Letters Patent should read as corrected below.

In the grant, line 1, and in the heading to the printed specification, line 3, name of inventor, for "Harry L. Van Hoene", each occurrence, read -- Harry L. Von Hoene --; in the heading to the drawings, Sheets 1 to 5, line 1 thereof, name of inventor, for "H. L. VAN HOENE", each occurrence, read -- H. L. VON HOENE --; column 10, line 63, after "gear" insert -- and being equispaced about the periphery of said sun gear, --; column 12, line 71, for "sai dring" read -- said ring --; column 13, line 1, strike out "and", second occurrence; line 8, for "opopsed" read -- opposed --.

Signed and sealed this 23rd day of March 1965.

(SEAL)
Attest:

ERNEST W. SWIDER                                        EDWARD J. BRENNER
Attesting Officer                                            Commissioner of Patents